United States Patent [19]
Takada

[11] 4,066,223
[45] Jan. 3, 1978

[54] AUTOMATIC LOCKING SAFETY BELT RETRACTOR DEVICE

[75] Inventor: Juichiro Takada, Tokyo, Japan

[73] Assignee: Takata Kojyo Co., Ltd., Tokyo, Japan

[21] Appl. No.: 710,988

[22] Filed: Aug. 2, 1976

[30] Foreign Application Priority Data

Sept. 29, 1975 Japan .................. 50-116433

[51] Int. Cl.² .................. A62B 35/02; B65H 75/48
[52] U.S. Cl. .................. 242/107.4 A; 242/107.7
[58] Field of Search .................. 242/107.4 R, 107.4 E, 242/107.6, 107.7; 280/744–747; 180/82 C; 297/388

[56] References Cited

U.S. PATENT DOCUMENTS

| 3,206,137 | 9/1965 | Snyderman .................. 242/107.7 X |
| 3,834,646 | 9/1974 | Heath .................. 242/107.4 A X |
| 3,858,826 | 1/1975 | Sprecher .................. 242/107.7 |

*Primary Examiner*—Harvey C. Hornsby
*Assistant Examiner*—John M. Jillions
*Attorney, Agent, or Firm*—Wolder & Gross

[57] ABSTRACT

A safety belt retractor includes a reel spring biased in a belt retraction direction and includes a braking mechanism which is operated by predetermined extractions of the belt followed by its retraction for selectively releasing the reel for retraction rotation or locking it against such rotation. Another braking mechanism is provided for locking the reel against extraction rotation in response to a vehicle predetermined acceleration or tilt. The retractor is characterized by a mechanism for releasing the reel retraction brake when the reel extraction brake mechanism is actuated. The braking mechanisms include oppositely oriented ratchet wheels rotatable with the reel and pawls movable into and out of engagement with respective ratchet wheels, the release mechanism including a motion transmission member actuated by the extraction braking pawl moving to engage position to move the retraction braking pawl to its retracted position. The motion transmission member is actuated by a slide member operated by the wheel extraction rotation in response to emergency conditions, the advancing slide member also advancing the extraction rotation locking pawl or the retraction locking pawl is actuated by an arm swingable with the extraction rotation locking pawl.

9 Claims, 8 Drawing Figures

AUTOMATIC LOCKING SAFETY BELT RETRACTOR DEVICE

BACKGROUND OF THE INVENTION

The present invention relates generally to improvements in vehicle safety belt retraction reels and it relates more particularly to an improved safety belt retraction reel of the type provided with mechanisms for locking the reel against belt extraction as well as against belt retraction.

Vehicles, particularly automobiles, are generally provided with safety belts in order to minimize or prevent the likelihood of injury to the vehicle occupant consequent to a vehicle accident. However, in spite of the many devices which have been available or proposed for facilitating and easing the application and wearing of the safety belt, a large percentage of the seat occupants still fail to use the safety belt. Among the devices which are widely employed are automatic safety belt retractor reels in which the reel is locked when the required length of belt is extracted and in which the belt is freely extractable and spring biased reel retracted but is automatically locked against retraction in response to certain emergency conditions such as excess vehicle acceleration or tilt. However, in each of these retractor devices a belt retracting force is constantly applied which results in a sense of oppression being imparted to the abdominal section and shoulders of the belt wearer. Accordingly, an important problem resulting from the above drawback and disadvantage of the conventional safety belt retraction reel is the elimination or prevention by the application of the belt to the wearer of the constant pressure to the wearer with its resulting inconvenience and discomfort.

SUMMARY OF THE INVENTION

It is accordingly a principal object of the present invention to provide an improved safety belt retractor device.

Another object of the present invention is to provide an improved safety belt retraction reel of the automatic belt extraction locking type either in response to belt extraction and manipulation or in response to vehicle emergency conditions.

Still another object of the present invention is to provide an improved automatic belt extraction locking belt extraction reel which is lockable against belt retraction to minimize the pressure of the spring retracted belt on the wearer.

A further object of the present invention is to provide a device of the above nature characterized by its reliability, ruggedness, simplicity, ease and convenience of application and use and great versatility and adaptability.

The above and other objects of the present invention will become apparent from a reading of the following description taken in conjunction with the accompanying drawings which illustrate preferred embodiments thereof.

In the belt retractor reel heretofore proposed, the emergency belt extraction locking mechanism and the belt retraction locking mechanism function independently and separately from each other. However, it has been found that in order for a safety belt retraction reel of the subject type to achieve its desired performance that it is essential that at no time should the belt extraction and belt retraction locking mechanisms be simultaneously actuated even in rare occasions. To assure that such simultaneous actuation action does not occur there is provided an improved mechanism in which the emergency locking of the belt extraction rotation of the reel acts on the belt retraction locking mechanism to prevent the operation of or release the latter.

Thus, in a sense, the present invention contemplates the provision of a safety belt retractor device comprising a reel rotatable in opposite belt retraction and extraction directions, a belt coupled to the reel and windable with belt retraction on the reel spring means biassing the reel to rotate in a belt retraction direction, a first means for braking the reel against belt extraction rotation and movable between release and brake positions, a second means for braking the reel against belt retraction rotation and movable between release and brake positions, and means responsive to the movement of the first braking means to brake position for moving the second brake means to release position.

The improved safety belt retractor reel overcomes the drawbacks of the conventional automatic locking self-rewinding safety belt reels and is reliable, simple and rugged and of great versatility and adaptability.

BRIEF DESCRIPTION OF THE DRAWINGS

FIG. 8 is a fragmentary view similar to FIG. 2 of another embodiment of the present invention.

DESCRIPTION OF THE PREFERRED EMBODIMENTS

Figure 1:
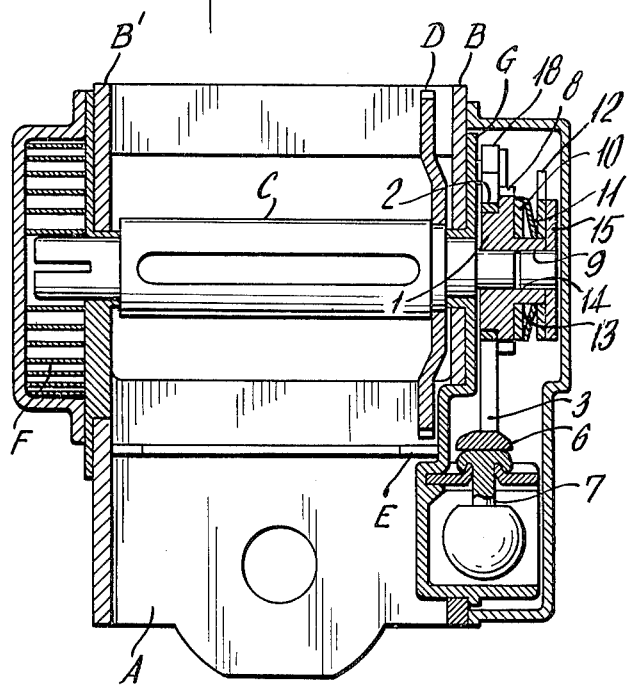
FIG. 1 is a vertical medial transverse cross-sectional view of a safety belt retractor reel embodying the present invention.
Figure 2:
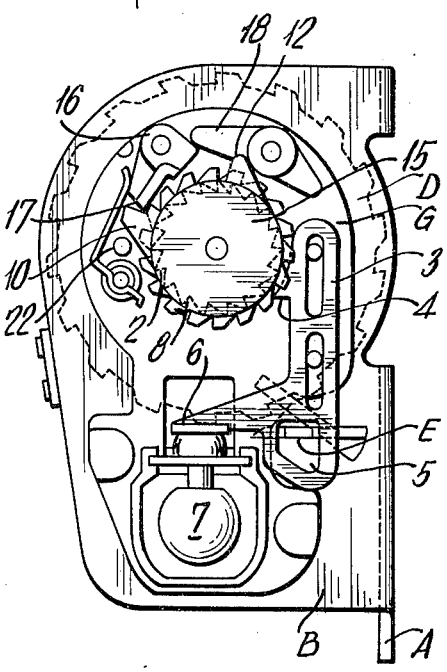
FIG. 2 is a side elevational view thereof with the control mechanism closure cap removed.

Referring now to the drawings, particulary FIGS. 1 to 7 thereof which illustrate a preferred embodiment of the present invention, the improved safety belt retraction reel comprises a belt extraction locking mechanism, as shown in FIGS. 1 and 2, which responds to vehicle emergency conditions and is of known construction including a U-shaped bracket or frame A, having side webs or frames B and B', a shaft C supported by and between the side webs B and B' and being capable of retracting the belt, a strong force ratchet wheel D (hereinafter referred to as "strong force wheel") secured to the shaft C between side webs B and B', a strong force pawl E rockably supported between the side webs B and B' so that it can engage and disengage the strong force wheel D, a spiral return spring F attached to the shaft C outside one side web B', a frame mounting plate G attached to the outside of the side web B, a lock wheel 1 secured to the end portion of the shaft C projecting outwardly of the mounting plate G, a belt extraction locking ratchet wheel 2 (hereinafter referred to as "extraction locking wheel"), a window member 5 including a second pawl 4 being capable of engagement with and disengagement from the extraction locking wheel 2 and being disposed to actuate pawl E toward the strong force wheel D by the engagement of the second pawl 4 with ratchet wheel 2, an L-shaped lever 3 formed with pawl 4 and window member 5 and mounted on attachment plate G for sliding movement and a weighted pendulum 7 or the like mounted below the mounting plate G to move the leg end 6 of the lower side of the L-shaped lever 3 toward its raised lifted position.

The device of the present invention further comprises an oppression preventing mechanism for locking the belt against spring retraction which includes a retraction locking ratchet wheel 8 (hereinafter referred to as "retraction locking wheel") molded integrally with the extraction locking wheel as a part of the lock wheel 1 and having teeth extending in an opposite direction relative to that of the teeth of extraction locking wheel 2, a stepped or two-stage cam provided disc 10, an annular plate spring 11 and a one-stage cam provided disc 12 which are provided and fitted in succession on a shaft or hub member 9 formed on the side of the lock wheel 1, a clutch plate 15 provided with a flanged coupling section 14 inserted into hub 9 and rotatably engaging a mating coupling section 13 disposed inside hub or shaft member 9, a third pawl 16 capable of engagement with and disengagement from retraction locking wheel 8 and two-stage cam disc 10 and engaging a fulcrum defining pivot on the upper side portion of mounting plate G and a spring 17 normally biassing the pawl 16 in the direction of engagement with cam or locking disc 10 and ratchet wheel 8.

In addition to the foregoing two mechanisms, in accordance with the present invention, there is provided a coupling member such as a double ended lever 18 disposed between the top end of the L-shaped lever 3 and the pawl 16 of the oppression preventing mechanism, so that it can swing in a manner to transfer the movement of the L-shaped lever 3 to the pawl 16.

Figure 3:
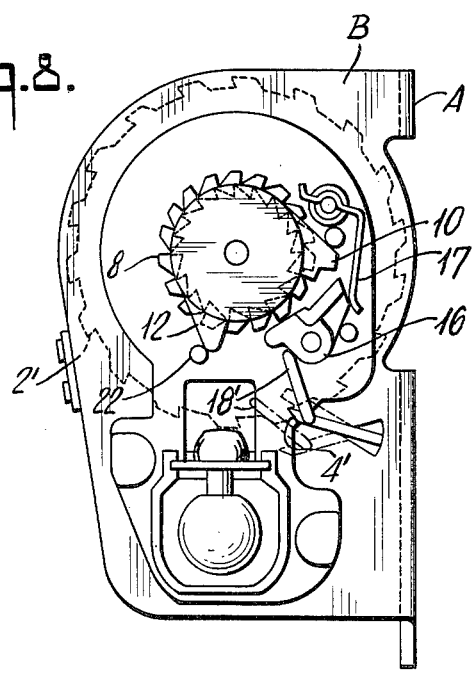
FIG. 3 is an exploded fragmentary perspective view of the control mechanism.
Figure 3:
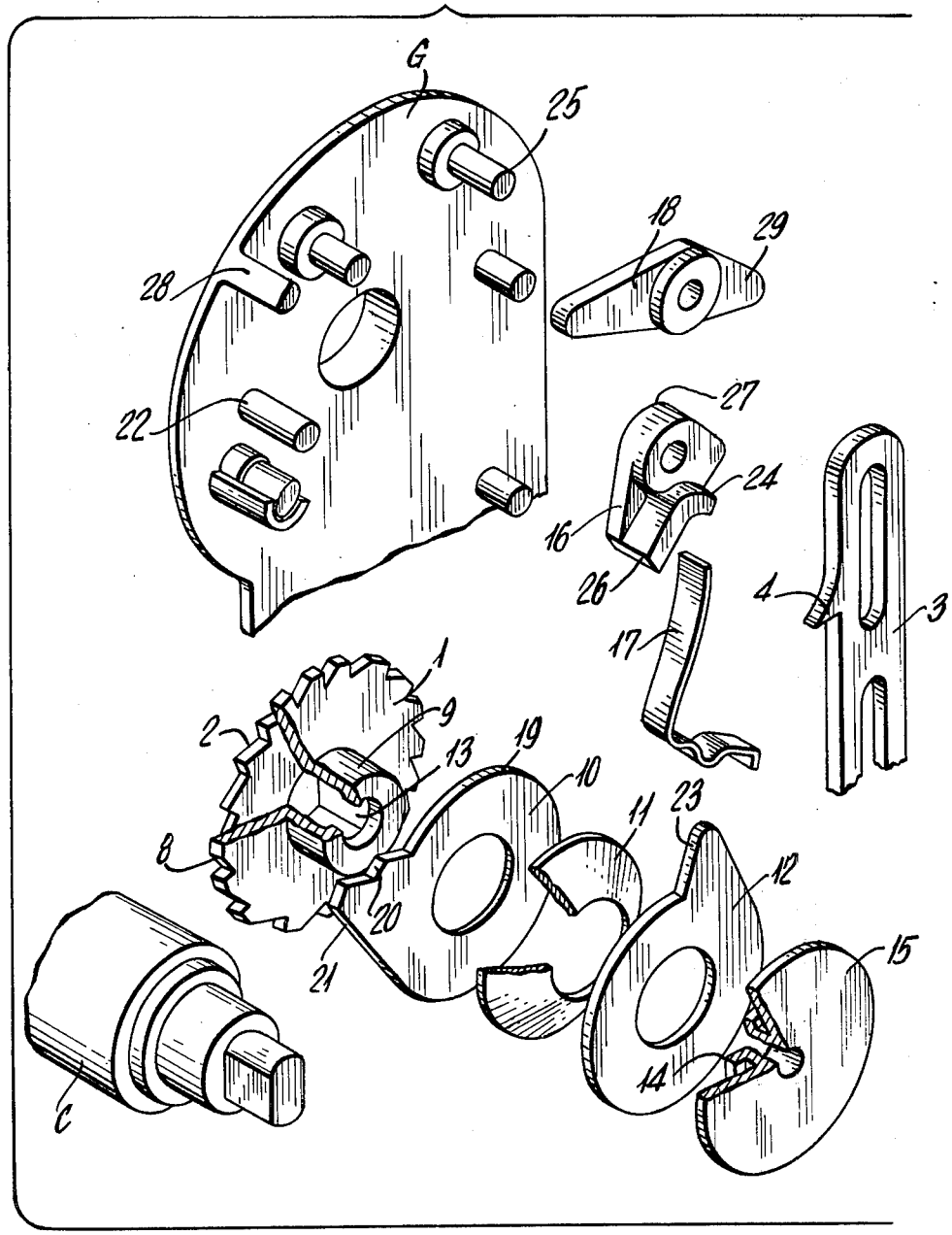

In the belt retracting device of the present invention having the above described structure, as shown in FIG. 3, the radius of the circular portion forming the first stage cam surface 19 of the disc 10 in the oppression preventing mechanism is smaller than the height of the tooth bases of the retraction locking wheel 8, and the height of a second cam or step portion 20 slightly exceeds the tooth top end of the retraction locking wheel 8. The operation or swinging range of the disc 10 is restricted by contact of the back face portion 21 of the cam with a pin 22 mounted on the plate G. When the one-stage cam disc 12 is turned in the counterclockwise direction as viewed in the drawings, a projecting cam portion or arm 23 formed on the periphery of the disc 12 presses a projection 24 mounted on the locking pawl 16 to cause it to pivot to a free or ratchet wheel release position. When the disc 12 is turned in the clockwise direction, its back face engages the fulcrum pin 25 of lever 18 or with a contact face or abutment formed on the machine cover, whereby to establish the entire operation or swinging range of the disc 12. The two-stage cam disc 10 and one-stage cam disc 12 are frictional slip driven under the influence of the frictional force between the lock wheel 1, disc 10, spring 11, disc 12 and clutch plate 15 by the side pressure bias force of the plate spring 11, and when retraction or extraction of the belt is effected, the disc 12 being turned within the above defined working range in the clockwise direction or anti-clockwise direction.

A pawl element 26 is formed on one end of the pawl member 16 and a flat face 27 is formed on the other side. By the counter-clockwise swinging movement of the lever 18, the flat face 27 is pushed by one end of the lever 18 and the pawl element 26 is moved toward a stop pin 28 provided on the plate G. These members are prevented from protruding externally by the unit cover which houses the assembly.

The operation of the device of the present invention having the above structure is hereinafter described.

Figure 4:
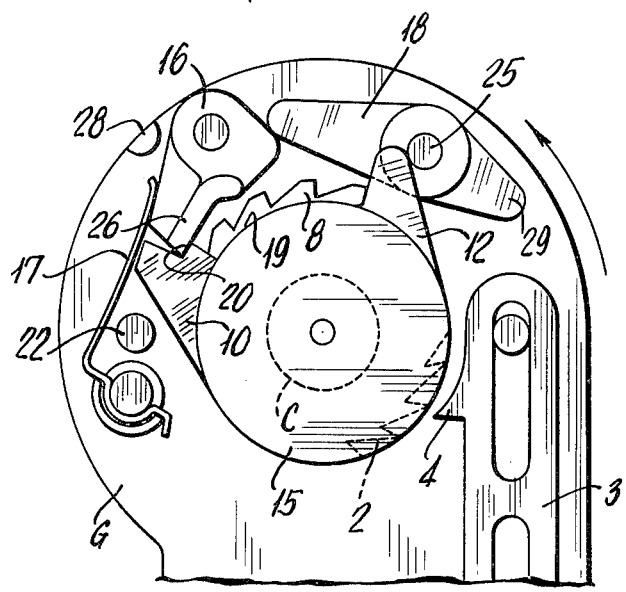
FIG. 4 is a side elevational view of the assembly control mechanism showing the braking mechanisms in release position.
Figure 5:
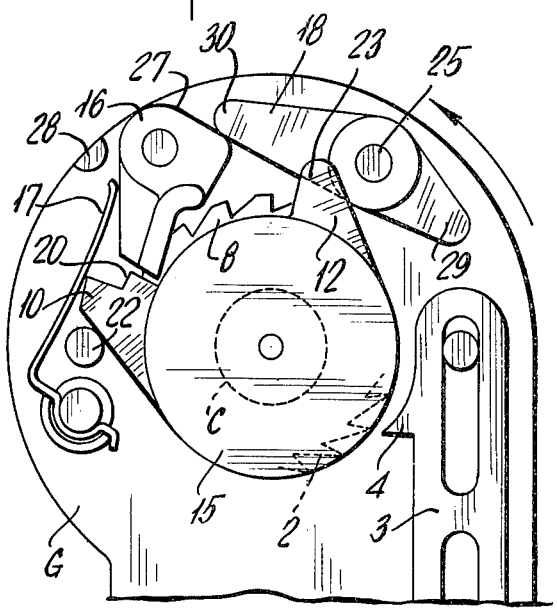
FIG. 5 is a view similar to FIG. 4 showing the belt retraction reel rotation braking mechanism only in braking position.
Figure 6:
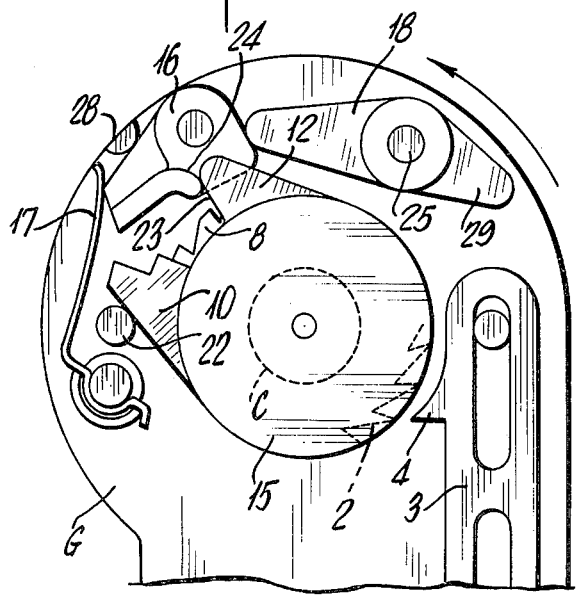
FIG. 6 is a side elevational view similar to FIG. 4 showing the releasing of the retraction braking mechanism.
Figure 7:
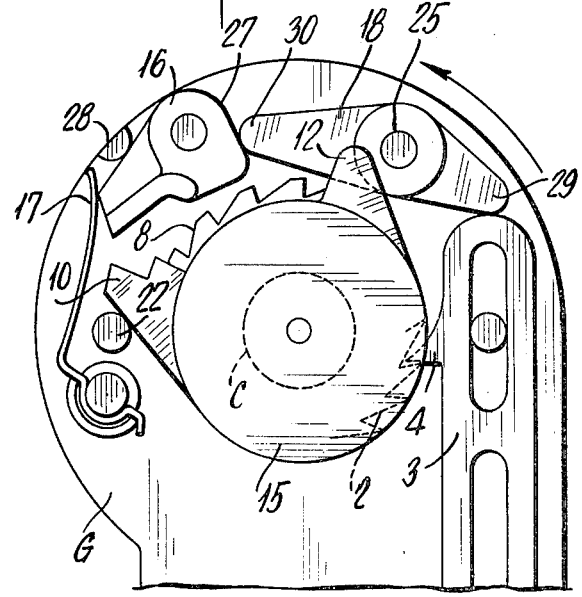
FIG. 7 is a side elevational view similar to FIG. 4 showing the actuation of the extraction braking mechanism with the accompanying transfer of the retraction braking mechanism to release position.

FIG. 4 illustrates the state where the belt can be freely retracted and extracted. FIG. 5 illustrates the state where retraction of the belt is locked. FIG. 6 illustrates the state where the locking of retraction is released, and FIG. 7 illustrates the state where in the case of emergency, extraction of the belt is locked and the retraction locking mechanism is deactuated.

In the case where both the belt retraction and extraction can be freely performed, as is shown in FIG. 4, the pawl 26 element of the pawl member 16 is engaged by the second cam surface 20 of the two-stage cam disc 10 and it is not engaged with the retraction locking wheel 8, partially shown in FIG. 4. The L-shaped lever 3 having the second pawl 4 is located at its normal lowered position and is separated from the extraction locking wheel 2 partially indicated by a dotted line. The onestage cam disc 12 is stopped at a point in engagement with the fulcrum pin 25 of the lever 18 in the retracting direction opposite to the belt extraction rotation direction which is indicated by an arrow. In the state shown in FIG. 4, both the retraction and extraction of the belt can be freely performed as explained above, but in this state, if the belt is slightly extracted, the two-stage cam disc 10 is turned in the belt extraction direction indicated by the arrow as above explained by the frictional drive force, and hence, the pawl 26 element of the locking pawl member 16 is separated from the second stage cam surface 20 and the disc 10 is moved to the stop pin 22 and the locking pawl member 16 engages the retracting locking wheel 8 as shown in FIG. 5, so that the retraction of the belt is locked and a sense of oppression is prevented from being imparted to the belt wearer. In the state shown in FIG. 5, when the belt is extracted any more than the prescribed angle, the one-stage cam disc 12 is turned in the extraction direction indicated by the arrow and the projecting cam 23 pushes the projection 24 of the locking pawl member 16 to thereby swing the locking pawl member 16 to the stop pin 28 against the influence of bias spring 17 and separate it from the retracting locking wheel 8 and the two-stage cam disc 10, whereby there is attained the state shown in FIG. 6 where the belt retracting lock is released.

Upon slight withdrawal of the belt from its retracted position with the mechanism in the position shown in FIG. 4, the discs 10 and 12 move counterclockwise allowing the pawl 16 to engage ratchet wheel 8, as shown in FIG. 5. Upon further withdrawal of the belt, the disc 12 is rotated further counterclockwise which allows cam surface 23 to pivot pawl 16 out of engagement with ratchet wheel 8. Upon further withdrawal of the belt to a position of use and slight retraction of the belt, the discs 10 and 12 rotate clockwise at which point the cam surface 20 prevents pawl 16 from engaging ratchet wheel 8, as again shown in FIG. 4. Then upon slight further withdrawal the pawl 16 engages ratchet 8 as seen in FIG. 5. When the belt is desired to be rewound, the belt is first withdrawn as seen in FIG. 6 allowing cam surface 23 to pivot pawl 16. Retraction can thus take place and the mechanism is reset to the FIG. 4 position.

In the state shown in FIGS. 5 or 4, if an emergency such as collision or inclination of the automobile occurs, the pendulum 7 is inclined and the second locking pawl 4 is raised thereby into engagement with locking wheel 2. With the extraction of the belt, the top of the L-shaped lever 3 is elevated to press and lift the confronting end 29 of the lever 18, and the other end 30 of the lever 18 presses and descends the flat face 27 of the locking pawl member 16, whereby the locking pawl member 16 is swung toward the stop pin 28 as shown in FIG. 6 and the belt retraction locking is released. Even when extraction of the belt is not rapid or even when the one-stage cam disc 12 is once retained in the state shown in FIG. 6 and is immediately returned reactionally in the direction indicated by the arrow, while the belt extraction force is applied, the locking pawl member 16 is kept separated as shown in FIG. 7.

While conventional emergency locking mechanisms and oppression-preventing mechanisms perform their functions independently, they can be operated without interference or hindrance in any of the states shown in FIGS. 4 to 6. However, when, for example, extraction of the belt is not prompt, and if the locking pawl member 16 is in the state shown in FIG. 5, the L-shaped lever 3 is in the state shown in FIG. 7 and both the pawls 4 and 16 are engaged, the belt cannot be retracted nor taken out and the retracting device represents a danger to a driver. In contrast, according to the present invention, as is shown in FIG. 7, if the second pawl 4 is engaged, the locking pawl member 16 is prevented from the retraction locking of ratchet wheel 8 by the transfer lever 18 in a manner as described above, and the improved retracting fully attains the intended objects. As is apparent from the foregoing illustration, when the belt is slackened even only slightly in the state shown in FIGS. 6 or 7, the state shown in FIG. 4 is restored by the retracting force of the return spring F.

In the embodiment having the structure and operation described above, there are disposed two pairs of the extraction locking members, namely the extraction locking ratchet wheel 2 and second pawl 4 and the strong ratchet wheel D and strong pawl E. However, the present invention is not limited to such arrangement, and a known emergency locking retracting device or automatic locking retracting device having only one pair of locking members, namely a strong ratchet wheel D and a strong pawl E can be utilized in the present invention. In this case, a coupling member capable of cooperating with such device is provided. For example, as is illustrated in FIG. 8, the ratchet wheel D is an extraction locking ratchet wheel indicated by the reference numeral 2' and the strong ratchet wheel cooperates with a second locking pawl member indicated by the reference numeral 4', and an arm or lever 18' corresponding to the lever 18 as the relating member is disposed in the vicinity of the top end of the second locking pawl 4' while changing the operation position of the oppression preventing mechanism, so that is performs the same function as the above-explained function of the lever 18.

As is seen from the foregoing illustrations, according to the present invention, a relating or transfer member is disposed between the locking members of conventional emergency locking mechanisms and the oppression preventing mechanisms which are arranged to operate independently, so that both the mechanisms can perform their related operations. Accordingly, a fatal defect frequently observed in the conventional device, namely the defect that both the locking pawls are simultaneously engaged, is effectively obviated, and the intended effects of the retracting device is positively and assuredly achieved by a simple structure according to the present invention. Accordingly, many great advantages are attained by the present invention.

While there have been described and illustrated preferred embodiments of the present invention, it is apparent that numerous alterations, omissions and additions may be made without departing from the spirit thereof.

I claim:

1. A safety belt retractor device comprising a reel rotatable in opposite belt retraction and extraction directions, spring means biasing said reel in a belt retraction rotation direction, a first braking means for braking said reel against rotation in a belt extraction direction and movable between a retracted release position and an advanced braking position, a second braking means for braking said reel against rotation in a belt retraction direction and movable between a retracted release position and an advanced braking position, and transfer means responsive to the actuation of said first braking means toward its advanced position for moving said second braking means toward its retracted position.

2. The safety belt retractor device of claim 1 wherein said first braking means comprises a first ratchet wheel rotatable with said reel and a first pawl movable into and out of engagement with said first ratchet wheel to brake and release said reel for belt extraction rotation, said second braking means comprises a second ratchet wheel rotatable with said reel and a second pawl movable into and out of engagement with said second ratchet wheel to brake and release said reel for belt retraction and said transfer means comprises means for moving said second pawl to a ratchet wheel disengage position with the actuation of said first pawl toward a ratchet wheel engage position.

3. The safety belt retractor device of claim 1 including actuating means responsive to the successive extraction and retraction rotation of said reel for alternatively positioning said second brake means in said braking or release positions.

4. The safety belt retractor device of claim 3 wherein said first braking means is normally in a release position and comprising means responsive to a predetermined acceleration for advancing said first braking means to a braking position.

5. The safety belt retractor device of claim 2 wherein said second pawl moving means comprises a swingable lever having one end advanceable with the movement of said first pawl toward its engage position and a second end engaging and retracting said second pawl with the advance of said lever.

6. The safety belt retractor device of claim 2, wherein said first braking means comprises a third ratchet wheel rotatable with said reel, a slide member carrying a third pawl movable into and out of engagement with said third ratchet wheel to slidably advance said slide member with extraction rotation of said reel and advance of said third pawl into engagement with said third ratchet wheel, vehicle acceleration responsive means for advancing said slide member and means responsive to the third ratchet wheel advance of said third pawl and slide member for advancing said first pawl into engagement with said first ratchet wheel.

7. The safety belt retractor of claim 2 wherein said second pawl moving means comprises a transfer arm connected to and movable with said first pawl and engaging and movable with said second pawl to its retracted position with the advance movement of said transfer arm and first pawl.

8. The safety belt retractor device of claim 7 comprising means supporting said first pawl and transfer arm for swinging movement between advanced and retracted positions and means supporting said second pawl for swinging movement between its advance and retracted positions.

9. The safety belt retracting device of claim 3 wherein said actuating means comprises a first driven member slip drive coupled to said reel and rotatable a predetermined angle and having a lock portion adapted to releasably lock said second pawl in its ratchet wheel disengage position and a second driven member drive slip coupled to said reel and rotatable a predetermined angle to swing said second pawl toward said second drive member with the belt extraction rotation of said reel.

* * * * *